Figure 1:
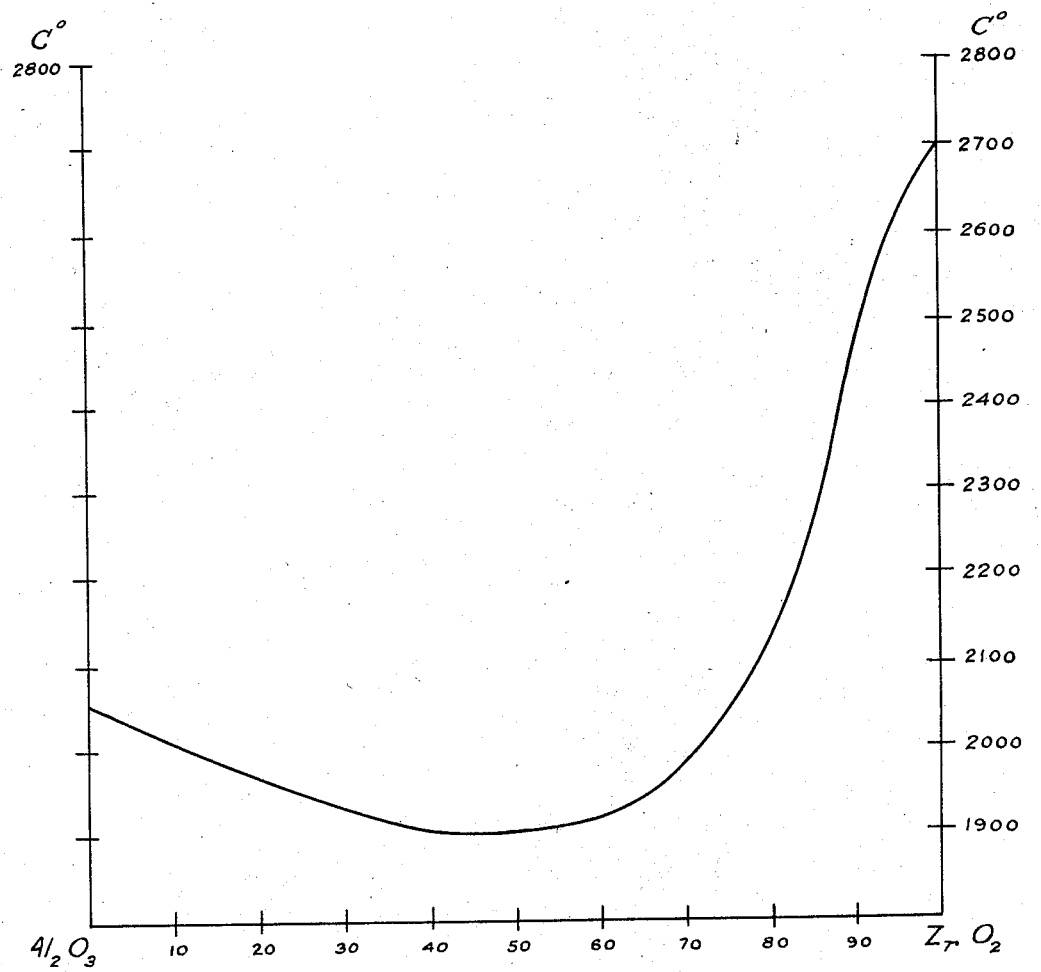

Patented Jan. 27, 1942

2,271,369

UNITED STATES PATENT OFFICE 2,271,369

REFRACTORY ZIRCONIA-ALUMINA CASTING

Gordon S. Fulcher, Chevy Chase, Md., and Theodore E. Field, Louisville, Ky., assignors to Corhart Refractories Company, Louisville, Ky., a corporation of Delaware Application October 24, 1939, Serial No. 301,081

7 Claims. (Cl. 106—57)

This invention relates to the manufacture of castings high in zirconia which are especially resistant to heat and the chemical action of fluxes, for example glass.

In U. S. Patent 1,615,751 to Fulcher there was described a cast refractory with 10 to 60% zirconia and containing alumina and silica, which could be made from zircon, zirkite, bauxite, diaspore, clay or equivalents. The composition with or without alkali was melted in an electric furnace, cast to shape and annealed.

As a result of this process the refractory contains a mixture of crystals of zirconia (baddeleyite), corundum, and mullite, or if the silica is low, of zirconia and corundum alone, and these crystals are embedded in an interstitial matrix of amorphous glass containing the residual zirconia, alumina, and silica, and any minor constituents present. When this refractory is tested against soda-lime-silica glasses it is found that resistance increases over a wide range as the zirconia is increased. From this it may be inferred that the zirconia crystals are more resistant to attack than either the corundum or mullite crystals since the residual glass phase remains more or less constant in amount. It has been observed however that the resistance ceases to increase after about 60% $ZrO_2$ content is reached. We have now discovered that with the commonly used materials this failure to increase further is not produced by a limitation in crystallization of the zirconia but is a result of the neutralizing effect of the glass phase resistance which becomes progressively poorer as the zirconia bearing material is increased. Apparently the closely knit crystal arrangement ordinarily slows down the dissolution of a glass phase with high softening temperature to nearly that of the crystal phases themselves. When the softening temperature of the glass phase becomes too low however the matrix is no longer rigid and mechanical erosion as well as chemical corrosion can occur. The progressively lower softening temperature of the glass phase obtained with high zirconia compositions have been traced to the increasing iron oxide. This results from increasing the zirkite percentage used, which ore is high in iron oxide. While the titania does not increase, it apparently is quite harmful and the more so, the more the iron oxide simultaneously present. While the differences seem small in the raw materials themselves, it must be remembered that the total of these non-crystallizable impurities will be found in the glass phase which constitutes only a small percentage of the final casting.

To illustrate the order of magnitude obtained, Table I shows the increase in $Fe_2O_3$ as the zirconia content of a typical zirkite and bauxite batch is increased.

Table I

|  | #1 | #2 | #3 | #4 | #5 |
| --- | --- | --- | --- | --- | --- |
| ZrO | 20 | 40 | 60 | 70 | 80 |
| $Fe_2O_3$ | 3.21 | 4.14 | 5.06 | 5.52 | 6.00 |
| $TiO_2$ | 2.22 | 1.75 | 1.30 | 1.07 | .83 |

In contrast to the results obtained with zirkite, we have discovered that when materials free iron oxide and titania are used, the resistance continues to increase up to the highest percentages of $ZrO_2$ which can be cast and from such materials superior refractories can thus be obtained. While the present high cost of pure materials precludes their general use in large tonnage, there are certain purposes for which the greater cost can be justified, for example such articles as feeder parts for glass furnaces, and crucibles.

While pure zirconia is very resistant, its melting point of 2700° C. makes its fusion and casting at present impractical. It can however be fluxed with alumina and if sufficient is used the relatively resistant corundum crystal phase is also obtained. This phase however is definitely less resistant than $ZrO_2$ so it is advantageous to use the minimum necessary to act as a flux. In Fig. 1 is given the melting point diagram of mixtures of $ZrO_2$ and $Al_2O_3$ and from this it is seen that when 25% $Al_2O_3$ has been added to $ZrO_2$ the melting point has been reduced to that of pure alumina and further additions are actually less refractory to heat than $Al_2O_3$ alone. We prefer therefore to use less than 25% $Al_2O_3$ as flux for zirconia. Typical useful batches are the following.

| #1 | | #2 | |
| --- | --- | --- | --- |
|  | Parts |  | Parts |
| Pure zirconia | 90 | Pure zirconia | 75 |
| Chemical alumina | 10 | Chemical alumina | 25 |

We prefer to use a relatively pure grade of alumina such as is produced by the Bayer process.

The higher the melting point, the greater the tendency to convert part of the alumina to carbide which appears to be objectionable in that it reacts with reducible materials in glass to produce gas which prevents fining. For this reason as well it is advisable to keep the melting points of high zirconia batches containing alumina at reasonable values. This can be done for example by combining an alkali with the alumina for flux. We have found that lithia is rather completely retained despite the high temperatures used. Potassia and soda can also be used but allowance must be made for volatilization losses. Up to 5% lithia is useful and if up to 2% potassia or soda are used the crystalline phases are still baddeleyite and corundum. We prefer to use the carbonates of the alkalies as being reasonably cheap and not too volatile but other salts which give the oxide after reaction can also be used. Typical batches follows:

| #1 | | #2 | |
|---|---|---|---|
| | Parts | | Parts |
| Pure zirconia | 85 | Pure zirconia | 88 |
| Chemical alumina | 10 | Chemical alumina | 10 |
| Lithium carbonate | 12.5 | Lithium carbonate | 5 |

| #3 | | #4 | |
|---|---|---|---|
| | Parts | | Parts |
| Pure Zirconia | 88 | Pure zirconia | 88 |
| Chemical alumina | 10 | Chemical alumina | 10 |
| Soda ash | 3.5 | Potassium carbonate | 2.9 |

Mixtures of the alkalies will in general give somewhat greater fluxing but as these systems are more complex and predictions of actual melting point more difficult we prefer to use one alkali at a time.

Since alkalies are relatively volatile at the high melting points encountered we have found it advantageous in many cases to use the more stable and therefore more easily controlled alkaline earths with the alumina as flux. Of the alkaline earths BeO, MgO, CaO, SrO and BaO, the last three form compounds with zirconia which are found to be poorly resistant to corrosion by glass while the other two form poorly resistant compounds with alumina. The percentage alkaline earth used must therefore not be excessive. We have found however that up to 15% alkaline earth can be added with the alumina for flux without excessively diminishing the resistance to corrosion. The alkaline earths can be added as oxides, carbonates, sulphates or other salts. Mixtures can be used but there is little advantage in this except for natural mixtures such as dolomite. Batches which are useful are given below:

| #1 | | #2 | |
|---|---|---|---|
| | Parts | | Parts |
| Pure zirconia | 70 | Pure zirconia | 70 |
| Chemical alumina | 10 | Chemical alumina | 10 |
| Burnt magnesite | 20 | Raw dolomite | 40 |

| #3 | | #4 | |
|---|---|---|---|
| | Parts | | Parts |
| Pure zirconia | 80 | Pure zirconia | 80 |
| Chemical alumina | 10 | Chemical alumina | 10 |
| Strontium sulphate | 18 | Barium carbonate | 13 |

We have also found that silica is a useful flux. If flint is added to the batch, volatilization of the silica is almost complete for the high melting refractories. However the silica can be introduced in a more advantageous way. In one process in the commercial manufacture of pure zirconia, the silica in purified zircon is first reduced to about 5 or 6% by melting it in an electric furnace with addition of coke. In the second step this low silica material is remelted and the remainder of the silica volatilized by the temperature obtained. If we use the low silica zirconia from the first step we not only save the expense of further processing but also add the silica in a fixed form rather than free. If alumina is added to keep the melting point reasonable, this silica is not volatilized excessively and a resistant refractory is obtained. For such a composition, silica can be adjusted upward by adding zircon in which the silica is also fixed, or downward by adding pure zirconia. When silica is present it forms a glass phase with some of the zirconia and alumina which in dissolving gives a viscous glass which may protect the surface. The dilution of a resistant crystal phase with too much less resistant glass phase is harmful of course but we have found that up to 15% silica can be added with alumina to the zirconia before resistance is excessively decreased. As useful batches, we may cite the following:

No. 1

| Parts | Material | $ZrO_2$ | $Al_2O_3$ | $SiO_2$ |
|---|---|---|---|---|
| 90 | Crude zirconia | 85 | | 5 |
| 10 | Chemical alumina | | 10 | |

No. 2

| Parts | Material | $ZrO_2$ | $Al_2O_3$ | $SiO_2$ |
|---|---|---|---|---|
| 80 | Crude zirconia | 76 | | 4 |
| 10 | Zircon | 6.6 | | 3.3 |
| 10 | Chemical alumina | | 10 | |
| | | 82.6 | 10 | 7.3 |

These compositions with silica can also be further fluxed if desired by adding alkali or alkaline earth in small percentages, individually or in mixtures. In this case however these constituents also go into the glass phase and make a matrix inherently less resistant to chemical attack by glass. Alkali or alkaline earth fluxes should therefore be used in the minimum quantities required to give the desired casting properties. Batches in this system are illustrated by the following:

No. 1

| Parts | Material | $ZrO_2$ | $Al_2O_3$ | $SiO_2$ | $Li_2O$ |
|---|---|---|---|---|---|
| 84 | Crude zirconia | 80 | | 4 | |
| 15 | Chemical alumina | | 15 | | |
| 2.5 | Lithium carbonate | | | | 1 |
| | | 80 | 15 | 4 | 1 |

No. 2

| Parts | Material | $ZrO_2$ | $Al_2O_3$ | $SiO_2$ | BaO |
|---|---|---|---|---|---|
| 80 | Crude zirconia | 76 | | 4 | |
| 15 | Chemical alumina | | 15 | | |
| 6.5 | Barium carbonate | | | | 5 |
| | | 76 | 15 | 4 | 5 |

No. 3

| Parts | Material | ZrO$_2$ | Al$_2$O$_3$ | SiO$_2$ | SrO |
|---|---|---|---|---|---|
| 80 | Crude zirconia | 76 | | 4 | |
| 15 | Chemical alumina | | 15 | | |
| 9 | Strontium sulphate | | | | 5 |
| | | 76 | 15 | 4 | 5 |

Having thus described the various compositions which will gave high zirconia castings containing alumina which are very resistant to attack by glass, what we claim is:

1. A cast refractory consisting essentially of zirconia and alumina and substantially free from iron oxide and titania, and in which the zirconia is not less than 60% and the alumina is not greater than 25% by weight by chemical analysis.

2. A cast refractory consisting essentially of zirconia, alumina and at least one of the group consisting of Li$_2$O, Na$_2$O and K$_2$O and substantially free from iron oxide and titania, and in which the zirconia is not less than 60% and the alumina is not more than 25% and the total alkali is not more than 5% by weight by chemical analysis.

3. A cast refractory consisting essentially of zirconia, alumina, and at least one of the group consisting of the alkaline earth oxides BeO, MgO, CaO, SrO, and BaO and substantially free from iron oxide and titania, and in which the zirconia is not less than 60% and the alumina is not more than 25% and the total alkaline earth is not more than 15% by weight by chemical analysis.

4. A cast refractory consisting essentially of zirconia, alumina and silica and substantially free from iron oxide and titania, and in which the zirconia is not less than 60% and the alumina is not more than 25% and the silica is not more than 15% by weight by chemical analysis.

5. A cast refractory consisting essentially of zirconia, alumina, silica and at least one of the group consisting of Li$_2$O, Na$_2$O and K$_2$O and substantially free from iron oxide and titania, and in which the zirconia is not less than 60% and the alumina is not more than 25%, the silica not more than 15% and the total alkali not more than 5% by weight by chemical analysis.

6. A cast refractory consisting essentially of zirconia, alumina, silica and at least one of the group consisting of the alkaline earth oxides BeO, MgO, CaO, SrO, and BaO and substantially free from iron oxide and titania, and in which the zirconia is not less than 60% and the alumina is not more than 25%, the silica not more than 15% and the total alkaline earth not more than 15% by weight by chemical analysis.

7. A cast refractory consisting essentially of crystalline zirconia and corundum in a substantially non-crystalline matrix substantially free from iron oxide and titania, and in which the total zirconia is not less than 60% and the total alumina not more than 25% by weight by chemical analysis.

GORDON S. FULCHER.
THEODORE E. FIELD.